US012769482B2

(12) United States Patent
Schuh et al.

(10) Patent No.: US 12,769,482 B2
(45) **Date of Patent: *Oct. 20, 2026**

(54) MEMORY SUB-SYSTEM MEDIA MANAGEMENT GROUPS

(71) Applicant: Micron Technology, Inc., Boise, ID (US)

(72) Inventors: Karl D. Schuh, Santa Cruz, CA (US); Jiangang Wu, Milpitas, CA (US); Kishore K. Muchherla, Fremont, CA (US); Ashutosh Malshe, Fremont, CA (US); Vamsi Pavan Rayaprolu, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/974,127

(22) Filed: Dec. 9, 2024

(65) Prior Publication Data

US 2025/0103246 A1 Mar. 27, 2025

Related U.S. Application Data

(63) Continuation of application No. 17/552,237, filed on Dec. 15, 2021, now Pat. No. 12,164,804.

(60) Provisional application No. 63/126,330, filed on Dec. 16, 2020.

(51) Int. Cl.
*G06F 3/06* (2006.01)

(52) U.S. Cl.
CPC .......... *G06F 3/0659* (2013.01); *G06F 3/0616* (2013.01); *G06F 3/064* (2013.01); *G06F 3/0653* (2013.01); *G06F 3/0679* (2013.01)

(58) Field of Classification Search
None
See application file for complete search history.

(56) References Cited

U.S. PATENT DOCUMENTS

| | | | | |
|---|---|---|---|---|
| 6,016,275 | A | 1/2000 | Han | |
| 6,618,794 | B1 | 9/2003 | Sicola | |
| 6,732,221 | B2 | 5/2004 | Ban | |
| 6,850,443 | B2 | 2/2005 | Lofgren et al. | |
| 8,356,152 | B2 | 1/2013 | You | |
| 2008/0162796 | A1 | 7/2008 | Chang et al. | |
| 2011/0320687 | A1 | 12/2011 | Belluomini | |
| 2012/0254503 | A1* | 10/2012 | Chiu | G06F 11/1441 711/E12.001 |
| 2018/0217892 | A1 | 8/2018 | Syu | |
| 2018/0267705 | A1* | 9/2018 | Liu | G06F 3/0679 |
| 2018/0357160 | A1* | 12/2018 | Gorobets | G06F 3/064 |
| 2019/0056989 | A1 | 2/2019 | Srinivasan | |
| 2020/0304148 | A1* | 9/2020 | Yang | G06F 11/1072 |
| 2020/0401328 | A1* | 12/2020 | Lee | G06F 3/0679 |
| 2021/0019080 | A1* | 1/2021 | Koo | G06F 3/064 |

* cited by examiner

*Primary Examiner* — Jared I Rutz
*Assistant Examiner* — Alexander J Yoon
(74) *Attorney, Agent, or Firm* — Brooks, Cameron & Huebsch, PLLC

(57) ABSTRACT

A system includes a memory device and a processing device coupled to the memory device. The processing device can assign each of a plurality of superblocks to one of a plurality of groups. The processing device can monitor an order that each of the groups have been written to. The processing device can write data to a first block of a first superblock of a first of the plurality of groups.

20 Claims, 6 Drawing Sheets

MEMORY SUB-SYSTEM MEDIA MANAGEMENT GROUPS

PRIORITY INFORMATION

This application is a Continuation of U.S. application Ser. No. 17/552,237, filed Dec. 15, 2021, which issues as U.S. Pat. No. 12,164,804 on Dec. 10, 2024, which claims the benefit of U.S. Provisional Application No. 63/126,330, filed Dec. 16, 2020, the contents of which are include herein by reference.

TECHNICAL FIELD

Embodiments of the disclosure relate generally to memory sub-systems, and more specifically, relate to memory sub-system media management groups.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
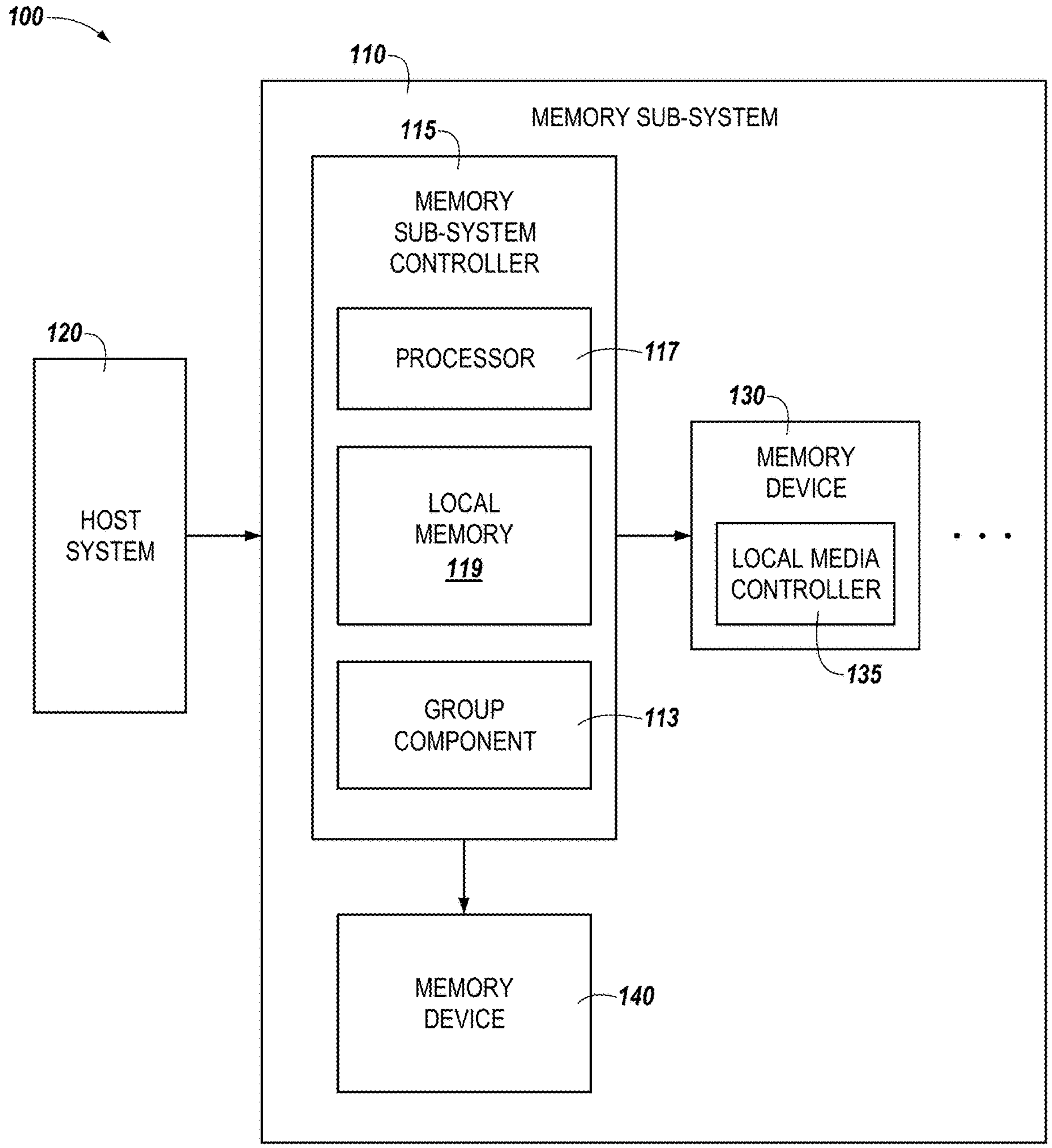
FIG. 1 illustrates an example computing system that includes a memory sub-system in accordance with some embodiments of the present disclosure.

Aspects of the present disclosure are directed to wear level groups associated with a memory sub-system, in particular to memory sub-systems that include a group component. A memory sub-system can be a storage device, a memory module, or a hybrid of a storage device and memory module. An example of a memory sub-system is a storage system, such as a solid state drive (SDD). Examples of storage devices and memory modules are described below in conjunction with FIG. 1. In general, a host system can utilize a memory sub-system that includes one or more components, such as "memory devices" that store data. The host system can provide data to be stored at the memory sub-system and can request data to be retrieved from the memory sub-system.

A memory device can be a non-volatile memory device. One example of non-volatile memory devices is a negative-and (NAND) memory device (also known as flash technology). Other examples of non-volatile memory devices are described below in conjunction with FIG. 1. A non-volatile memory device is a package of one or more dice. Each die can consist of one or more planes. Planes can be groups into logic units (LUN). For some types of non-volatile memory devices (e.g., NAND devices), each plane consists of a set of physical blocks. Each block consists of a set of pages. Each page consists of a set of memory cells ("cells"). A cell is an electronic circuit that stores information. A block hereinafter refers to a unit of the memory device used to store data and can include a group of memory cells, a word line group, a word line, or individual memory cells. For some memory devices, blocks (also hereinafter referred to as "memory blocks") are the smallest area than can be erased. Pages cannot be erased individually, and only whole blocks can be erased.

Each of the memory devices can include one or more arrays of memory cells. Depending on the cell type, a cell can be written to in order to store one or more bits of binary information, and has various logic states that correlate to the number of bits being stored. The logic states can be represented by binary values, such as "0" and "1", or combinations of such values. There are various types of cells, such as single level cells (SLCs), multi-level cells (MLCs), triple level cells (TLCs), and quad-level cells (QLCs). For example, a SLC can store one bit of information and has two logic states.

Some NAND memory devices employ a floating-gate architecture in which memory accesses are controlled based on a relative voltage change between the bit line and the word lines. Other examples of NAND memory devices can employ a replacement-gate architecture that can include the use of word line layouts that can allow for charges corresponding to data values to be trapped within memory cells based on properties of the materials used to construct the word lines.

An SSD is a type of memory sub-system that uses integrated circuit assemblies to store data persistently, typically using flash memory. An SSD can include memory devices that include one or more arrays of memory cells. The performance, endurance, and/or retention of an SSD can be related to the type(s) of memory cells employed by the SSD. In general, as the quantity of bits stored per cell increases, the sensitivity of retention (the ability to maintain stored data integrity over a specified length of time) of the memory cell to fluctuations in temperature tends to increase. A retention failure can lead to errors and can cause events that are performed by the SSD to fail or not occur correctly. Temperature fluctuations can occur for extended periods of time during transportation of an SSD post-manufacturing. As an example, memory cells storing data in a single-level cell (SLC) mode can be less susceptible to damage due to high temperature fluctuations than a memory cell storing data in a non-SLC (e.g., multi-(MLC), tri-(TLC), or quad-(QLC), penta-(PLC) level cell mode).

A flash memory device can include a flash transition layer (FTL) that can be used (e.g., during a programming operation performed on the flash memory device) to map logical addresses to physical addresses in the flash memory (e.g., via a logical to physical (L2P) table). As an example, in some previous approaches, an entry in a logical to physical (L2P) address mapping table can include a reference to a die, block, plane, and page of memory that a portion of data is stored in. Further, a die can include a number of planes, the number of planes can each include a number of blocks, and the number of blocks can each include a number of pages.

A vehicle can include a memory sub-system, such as a solid state drive (SSD). The memory sub-system can be used for storage of data by various components of the vehicle, such as applications that are run by a host system of the vehicle. One example of such an application is an event recorder of the vehicle, which may also be referred to as a "black box" or accident data recorder. The event recorder needs to be able to store the host data for later retrieval in response to a trigger event, such as an accident, but it is not necessary that the event recorder store the host data any more quickly than is necessary to keep up with the required throughput.

The emergence of autonomous vehicles, Internet of Things (IoT) and surveillance devices has resulted in a wider gap in between the total bytes written (TBW) in a useable lifetime of a memory sub-system and a user capacity of the memory sub-system. For example, the TBW to user capacity ratio for some memory systems used for such applications has increased by one to three orders of magnitude. Some autonomous vehicles require real time buffering of telemetric data such as video cameras, radar, lidar, ultra-sonic and other sensors that are necessary to playback the sequences preceding an accident. The data from various sensors sums up to a substantial throughput requirement per unit time (e.g., 1 gigabyte per second (GB/sec) sequential write throughput from a host). Upon a trigger event, a quantity of data corresponding to a predetermined playback time immediately preceding the event needs to be captured (e.g., to determine the cause of an accident). The recorded telemetric sensor data corresponding to the predetermined playback time can be referred to as a "snapshot." An event recorder is one such application in where the user capacity requirement could be as low as one hundred and twenty-eight (128) GB, but the TBW requirement could be as high as hundreds of Peta Bytes. The examples of values given are not limiting but highlight the relative difference between the requirements for capacity and TBW. An event recorder may need to store at least a few, most recent snapshots.

Storing and monitoring these snapshots can consume large amounts of data if the snapshots are particularly large or particularly difficult to monitor (e.g., store large amounts of data in a mapping table or large amounts of data transferred across a flash translation layer) (FTL)). However, the size of (e.g., the amount of data stored in) address mapping tables can become very large as the size of the memory (e.g., non-volatile storage array, NAND) to be mapped becomes larger or if larger portions of the memory are stored for accessing a particular physical location of the snapshot in the memory. Main memory (such as in DRAM) can be expensive and space can be limited. As in previous approaches, a fixed, large address mapping table can be difficult to fit into an already limited amount of memory (e.g., non-volatile storage array, NAND) space. The larger the address mapping table, the more difficult it can be to fit a portion of the address mapping table into a cache without affecting a cache hit rate. Further, as the size of memory mapped by the FTL increases, the size of the address mapping table can increase to a size that becomes difficult to manage. Further, in the instance where an L2P table is stored in an SLC mode, an amount of times the L2P table is accessed can affect performance of the memory cells storing the L2P table.

Further, locations of memory in the memory device can be monitored and located using the FTL in order to determine a group of data to write to based on wear leveling characteristics and limitations. The more portions of data used for wear leveling purposes, the more data locations that need to be tracked. As is described below, by using larger portions of data for wear leveling purposes, fewer portions of data can be tracked and the memory mapped by the FTL can be decreased in order to carry out wear leveling on the memory device.

Aspects of the present disclosure address the above and other deficiencies by using larger portions of data to perform wear leveling. As an example, more than one superblock of data can be used for a media management group for monitoring and performing wear leveling operations. In situations where large portions of data are being received from sensors and/or memory infrastructure (such as in an autonomous vehicle environment), and the integrity of the data being very important for data processing purposes, increasing a size of a wear leveling chunk (which can be referred to as a "group" herein) can provide for a more efficient and less resource intensive process for performing wear leveling. In this way, accessing the received data is simplified and a decrease in the amount of data used in the L2P table and/or FTL can be reduced. An advantage of the present disclosure includes minimizing an amount of data to be monitored and/or tracked for wear leveling operations. Embodiments described herein include a group component resident on the memory sub-system (e.g., on the memory sub-system controller), to make it possible to monitor media management groups by the memory sub-system.

By increasing the size of data for each portion of data used to perform wear leveling, a size of data used for the L2P table, or a size of an L2P table entry, the SLC memory cells storing the L2P table can have improved endurance over a period of time of use. Further, the L2P table and/or the FTL can be smaller, thereby using less memory space for the L2P table. In addition, the L2P table can be reconstructed in a shorter amount of time and with less processing resources. As memory drives continue to increase in size, a method to reduce the size of an address mapping table and/or the FTL can allow for larger memory drive sizes without a corresponding increase in the address mapping table or FTL used to map a logical address to a physical address. In this way, physical memory space used for storing address mapping tables can be minimized and the scalability of the address mapping tables can be increased. Further, limiting storage of the data to an SLC mode can provide a more beneficial experience. For example, memory cells in an SLC mode can be accessed and written to faster and thereby provide an improved user experience.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO- DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include various combinations of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) includes negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130, 140 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLC) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as three-dimensional cross-point arrays of non-volatile memory cells and NAND type memory (e.g., 2D NAND, 3D NAND) are described, the memory device 130 can be based on any other type of non-volatile memory or storage device, such as such as, read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 130. The memory sub-system controller 115 can further include host interface circuitry to communicate with the host system 120 via the physical host interface. The host interface circuitry can convert the commands received from the host system into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 130 and/or the memory device 140.

In some embodiments, the memory device 130 includes local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 includes a group component 113 that can be configured to orchestrate and/or assist performance of wear level operations to determine which portion of the data to erase and currently write to and can use various components, data paths, and/or interfaces of the memory sub-system 110 to do so. The group component 113 can include various circuitry to facilitate control of the erasure and storage of data in the memory cells and its corresponding LBA in a logical to physical (L2P) table. For example, the group component 113 can include a special purpose circuitry in the form of an ASIC, FPGA, state machine, and/or other logic circuitry or software and/or firmware that can allow the group component 113 to orchestrate and/or perform media management operations such as wear level operations and communicate to various components, data paths, and/or interfaces of the memory sub-system 110.

The group component 113 can be communicatively coupled to the memory devices 130, 140 and can access the memory device 130, the memory device 140, internal data paths of the memory sub-system 110, and/or interfaces of the memory sub-system 110 to perform the operations described herein and/or to transfer storage data to additional elements of the memory sub-system 110. In some embodiments, the operations performed by the group component 113 can be performed during an initialization or pre-initialization stage of data transfer within the memory sub-system 110 and/or the memory sub-system controller 115. Accordingly, in some embodiments, the group component 113 can perform the operations described herein prior to data transfer in order to determine a mode that data is stored in, which can affect subsequent data transfer speeds of the data out of the cells storing in that particular mode.

In some embodiments, the memory sub-system controller 115 includes at least a portion of the group component 113. For example, the memory sub-system controller 115 can include a processor 117 (processing device) configured to execute instructions stored in local memory 119 for performing the operations described herein. In some embodiments, the group component 113 is part of the host system 110, an application, or an operating system.

The memory devices 130, 140 in FIG. 1 can include a number of physical blocks in accordance with some embodiments of the present disclosure. For example, the memory devices 130, 140 can include a NAND flash memory array including the number of physical blocks. However, embodiments of the present disclosure are not limited to a particular type of memory or memory array. For example, the memory array can be a DRAM array, an RRAM array, or a PCRAM array, among other types of memory arrays. Further, the memory array can be located on a particular semiconductor die along with various peripheral circuitry associated with the operation thereof.

The memory cells of the memory array can be mixed mode cells operable as SLCs and/or XLCs (e.g., extra-level cells which can refer to cells operable at a level greater than SLCs). The number of physical blocks in the memory array can be 128 blocks, 512 blocks, or 1,024 blocks, but embodiments are not limited to a particular multiple of 128 or to any particular number of physical blocks in memory array. Further, different portions of memory can serve as a dynamic SLC cache for wear leveling and/or garbage collection purposes. For example, different portions of memory can be dynamically increased and/or decreased in size as demands on the memory are increased and/or decreased and wear leveling and garbage collection more efficiently address these demands.

Each physical block of the memory array can contain a number of physical rows of memory cells coupled to access lines (e.g., word lines). The number of rows (e.g., word lines) in each physical block can be 32, but embodiments are not limited to a particular number of rows per physical block. Further, the memory cells can be coupled to sense lines (e.g., data lines and/or digit lines).

Each row can include a number of pages of memory cells (e.g., physical pages). A physical page refers to a unit of programming and/or sensing (e.g., a number of memory cells that are programmed and/or sensed together as a functional group). Each row can comprise one physical page of memory cells. However, embodiments of the present disclosure are not so limited. For instance, in a number of embodiments, each row can comprise multiple physical pages of memory cells (e.g., one or more even pages of memory cells coupled to even-numbered bit lines, and one or more odd pages of memory cells coupled to odd numbered bit lines). Additionally, for embodiments including XLCs, a physical page of memory cells can store multiple pages (e.g., logical pages) of data, for example, an upper page of data and a lower page of data, with each cell in a physical page storing one or more bits towards an upper page of data and one or more bits towards a lower page of data.

In a non-limiting example, an apparatus (e.g., the computing system 100) can include a memory sub-system group component 113. The memory sub-system group component 113 can be resident on the memory sub-system 110. As used herein, the term "resident on" refers to something that is physically located on a particular component. For example, the memory sub-system group component 113 being "resident on" the memory sub-system 110 refers to a condition in which the hardware circuitry that comprises the memory sub-system group component 113 is physically located on the memory sub-system 110. The term "resident on" can be used interchangeably with other terms such as "deployed on" or "located on," as referred to herein.

The memory sub-system group component 113 can be configured to determine which portions of the data are within which wear leveling group. The wear leveling groups can each include data that is larger than is stored in a single superblock in the memory. For example, data stored in more than one superblock can be in a wear leveling group. As use herein, a "superblock" is a set of data blocks that span multiple die that are written in an interleaved fashion. In some cases, a superblock can span all the die within a memory sub-system or memory device. A superblock can contain multiple data blocks from a single die. In some embodiments, a superblock can be a unit of management within the memory sub-system. Accordingly, a superblock can refer to a plurality of blocks that include one block from every NAND memory device attached to a solid state drive (SSD). The memory sub-system group component 113 can determine which initial wear leveling group to be writing data to in addition to determining which additional wear leveling group to be erasing from, where erasure occurs in anticipation of writing to that additional wear leveling group when switching from the initial wear leveling group.

The memory sub-system group component 113 can switch writing to groups of memory blocks, that can be referred to herein for simplicity as "wear leveling groups," in response to a number of different events, as will be described further below. In one example, the memory sub-system group component 113 can switch from writing to an initial wear leveling group to writing to an additional wear leveling group in response to a host requesting to switch wear leveling groups. In one example, the memory sub-system group component 113 can switch from writing to an initial wear leveling group to writing to an additional wear leveling group in response to a capacity of storage of the initial wear leveling group being reached. In one example, the memory sub-system group component 113 can switch from writing to an initial wear leveling group to writing to an additional wear leveling group in response to a programming error occurring with the initial wear leveling group.

Figure 2A:
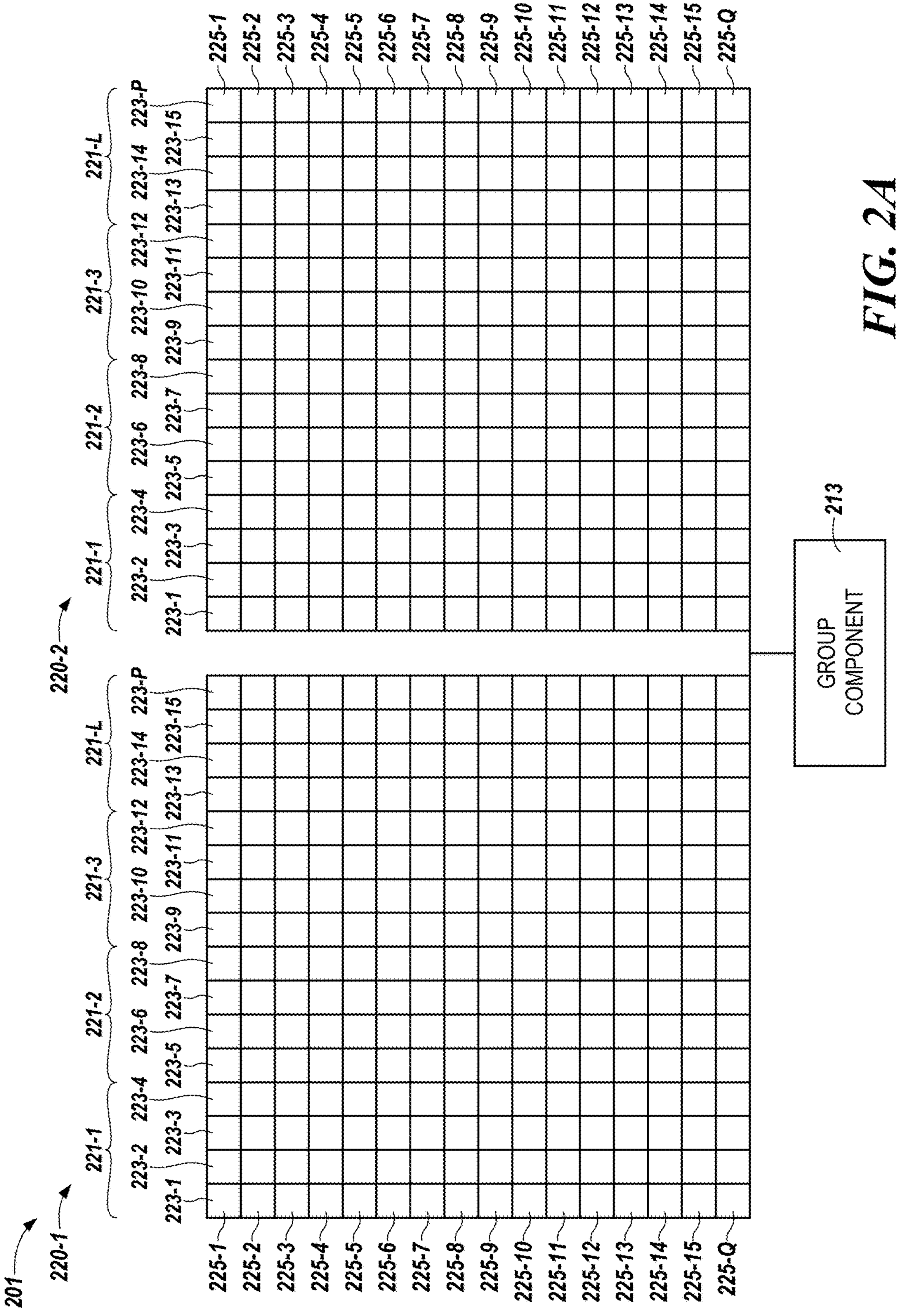
FIG. 2A illustrates an example of a plurality of superblocks in accordance with some embodiments of the present disclosure.

FIG. 2A illustrates an example block of memory cells 201 that include or make up a plurality of superblocks 220-1, 220-2 in accordance with some embodiments of the present disclosure. Each of the plurality of superblocks, 220-1, 220-2 can span multiple memory dice 221-1 to 221-L. Each of the plurality of superblocks 220-1, 220-2 can include multiple planes 223-1 to 223-P, and multiple pages 225-1 to 225-Q. Although not explicitly shown, the pages 225-1 to 225-Q can be coupled to word lines (e.g., access lines) and can, as is appropriate given the context, be referred to as word lines 225-1 to 225-Q, herein. In some embodiments, the block of memory cells 220 can include at least one set of interleaved NAND memory cells that are coupled to a stackable cross-gridded array of memory cells (e.g., a 3-D NAND device) and/or can be a portion of a replacement-gate NAND device.

Data can be written to portions of the plurality of superblocks 220-1, 220-2 that can be operated as described above and in connection with FIGS. 2B-2C, herein. For example, the group component 213 (such as group component 113 illustrated in FIG. 1) can control assigning each of the plurality of superblocks 220-1, 220-2 to one of a plurality of groups (e.g., the groups 227-1 to 227-4 illustrated in FIG. 2C, herein) for performance of a media management operation. The group component can further perform operations including monitoring an order that each of the plurality of groups have been written to and writing data to a particular portion of a first superblock (e.g., the superblock 220-1) of a first of the plurality of groups based, at least in part, on the monitored order.

Further, each of the plurality of superblocks can include a plurality of blocks of memory of the memory device. Data can be written to each of the blocks of each of the superblocks in a particular group and, in response to writing to an end of the first group, data can continue to be written to a beginning portion of the first group, thereby overwriting previously written data at the beginning portion. An additional superblock of the first group can be erased prior to completion of writing to a prior superblock. The second superblock can be ordered as written to subsequent to the prior superblock. The additional superblock can be erased concurrently with the writing of the data to the prior superblock of the first group.

In some embodiments, in response to a failure while writing to the first superblock, additional data can be written to the second superblock. In response to receiving a request from a host (such as host 120 in FIG. 1) to write to a second of the plurality of groups, a last write location that data was written to at reception of the request can be recorded or saved. An additional group of the plurality of groups to write data to can be determined based on wear leveling characteristics.

Figure 2B:
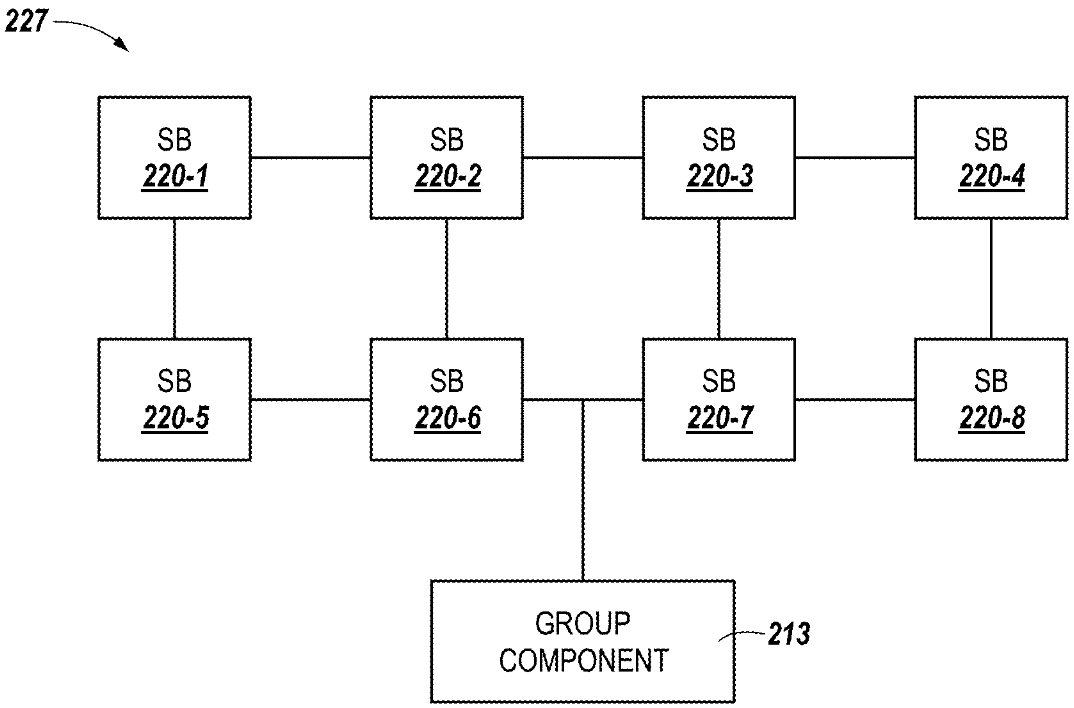
FIG. 2B illustrates an example of a media management group in accordance with some embodiments of the present disclosure.

FIG. 2B illustrates an example of a media management group 227 in accordance with some embodiments of the present disclosure. In the alternative, the media management group 227 can be referred to as a "wear leveling group." A wear leveling group 227 can include a plurality of superblocks (SBs) 220-1, 220-2, 220-3, 220-4, 220-5, 220-6, 220-7, 220-8 (hereinafter referred to collectively as a plurality of superblocks 220). The superblocks 220 can be similar to superblocks 220-1 and 220-2 in FIG. 2A. The wear leveling group 227 can be used to perform a number of media management operations, such as wear leveling operations. The plurality of superblocks can be pre-assigned to a wear leveling group 227 prior to initiation of writing data. In some embodiments, data can be written across each of the blocks in the superblocks 220 of the wear leveling group 227 before data is written to another wear leveling group. In this way, a location of a large quantity of data can be within a single wear leveling group, thereby minimizing an amount of locations that a memory sub-system may have to track and/or monitor.

As an example, in response to data being written to the blocks in the first superblock 220-1, the data can be written to the blocks in a second superblock 220-2, and so forth, until each of the superblocks 220 have been written to (e.g., first superblock 220-1, then second superblock 220-2, then third superblock 220-3, and so forth through eighth superblock 220-8, in this example). While eight superblocks are illustrated as in the wear leveling group 227, examples are not so limited. Any number of superblocks can be in a wear leveling group 227, depending on how large or small the wear leveling group 227 is desired to be based on a number of parameters, such as an amount of storage locations available to track the data. That is, if the amount of storage locations available to track the data is larger, the quantity of superblocks 220 in a wear leveling group 227 may be smaller as more wear leveling groups 227 can be tracked. In the alternative, if the amount of storage locations available to track the data is smaller, the quantity of superblocks 220 in a wear leveling group 227 may be larger as fewer wear leveling groups 227 can be tracked.

Once data is written to each of the blocks of each of the superblocks 220 in a wear leveling group 227, the data can begin to be written to the first block by overwriting the data in the first block. As an example, after data is written to a last block of the eighth superblock 220-8, the data can then be written to a first block of the first superblock 220-1. In this way, data can be cyclically written to a wear leveling group 227 until a message or indication to do otherwise is received. This creates a snapshot or a particular record of the data that can be retrieved for subsequent analysis. In response to receiving a message to switch to a new wear leveling group (e.g., the wear leveling group 227-1), the prior wear leveling group (e.g., the wear leveling group 227-8) can then be used as a previous snapshot of complete data during a particular period of time or for a particular quantity of data.

Figure 2C:
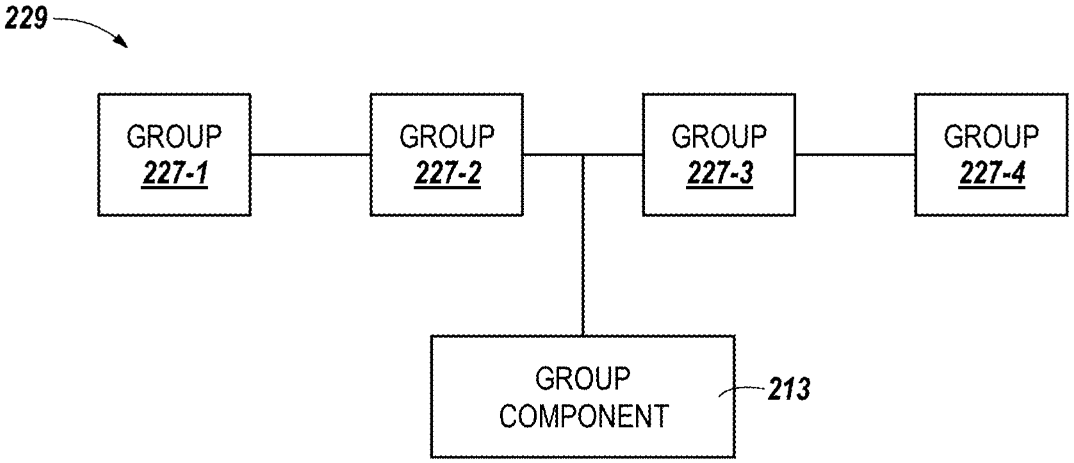
FIG. 2C illustrates an example of a plurality of media management groups in accordance with some embodiments of the present disclosure.

FIG. 2C illustrates an example of a plurality 229 of media management groups 227-1, 227-2, 227-3, 227-4 in accordance with some embodiments of the present disclosure. In some embodiments, data can be written to blocks within a superblock (e.g., one of the superblocks 220 illustrated in FIG. 2B) of a first wear leveling group 227-1. In response to receiving a message to switch to a subsequent wear leveling group, a memory sub-system can begin writing data to a first block of a first superblock of a second wear leveling group 227-2. The second wear leveling group 227-2 can be chosen for writing new data to due to the second wear leveling group 227-2 having a lowest wear leveling value in comparison to the other wear leveling groups. The first wear leveling group 227-1 can be used as a snapshot that is complete if the data was written across each of the blocks of each of the superblocks of the first wear leveling group 227-1. When the second wear leveling group 227-2 has no valid data when the memory sub-system switched to writing to the second wear leveling group 227-2, the data can be written to the second wear leveling group 227-2 without further modification. However, in response to the second wear leveling group 227-2 including valid data, the valid data within the block to be written to can be transferred to a block of a wear leveling group with a highest wear leveling value that also does not include valid data. In this way, a snapshot of the data that was valid in the second wear leveling group 227-2 is preserved. Thereby, the valid data in the second wear leveling group 227-2 continues to be written to the block of the wear leveling group with the highest wear leveling value as it is erased and written over while new data is written to the second wear leveling group 227-2. In another example, in response to all wear leveling groups including valid data, the wear leveling group including the oldest snapshot can be chosen (for example, 227-3) as a destination for the data previously stored in wear leveling group 227-2, and the oldest snapshot contained in 227-3 can be discarded. Or, in the instance where all wear leveling groups include valid data, and wear leveling group 227-2 has both the lowest wear leveling value and contains the oldest snapshot, the data previously contained in wear leveling group 227-2 can be discarded. In this way, the system ensures that the most recent snapshots are retained and a number of times that the data is moved is minimized.

In some embodiments, while a first block of a first superblock 220-1 is being written to, a second block of the first superblock 220-2 may have previously been erased and a third block of the first superblock 220-1 is being actively erased while the first block is written to. In this way, in response to a failure within the first block, writing can continue in the second block with the third block being prepared to be written to. For example, while a first block is written to, a second block has been erased and a third block is being actively erased. In response to the first block experiencing a failure, data begins to be written to the second block, the third block is immediately erased completely and erasure of a fourth block begins while data is written to the second block. In this way, a full block subsequent to the block being written to is erased and ready to be used while an additional block is being erased to anticipate such a switch during a failure.

The blocks within a superblock, and therefore a wear leveling group, can be ordered such that they are accessed serially, for example, using a linked list or other serially accessed data structure. The ordering of the blocks can be adjusted based on a number of events that occur in relation to that (e.g., a particular) wear leveling group. The blocks can be arranged based on performance, based on grouping valid ("good") or particular data being within particular blocks and invalid ("bad") data being within another group of the blocks, etc. In some embodiments, a next block to write to can be an oldest block in a wear leveling group or a block with the least number of erases over a given period of time (in order to attempt to level the wear on the system). An oldest block can refer to a block where data was written at a time period that precedes writing of any other block that has not yet been erased or invalidated.

By using the wear leveling groups described above, a snapshot of a particular time period or volume of data can be retrieved with less data to describe the location of that data. For example, the beginning of a snapshot, such as a beginning of the first wear leveling group 227-1, can be stored and the first wear leveling group 227-1 includes a complete snapshot that spans multiple superblocks. If the memory sub-system receives a message to switch to a subsequent wear leveling group, the previous wear leveling group (227-1) becomes a previous snapshot and a new snapshot is being compiled.

Figure 3:
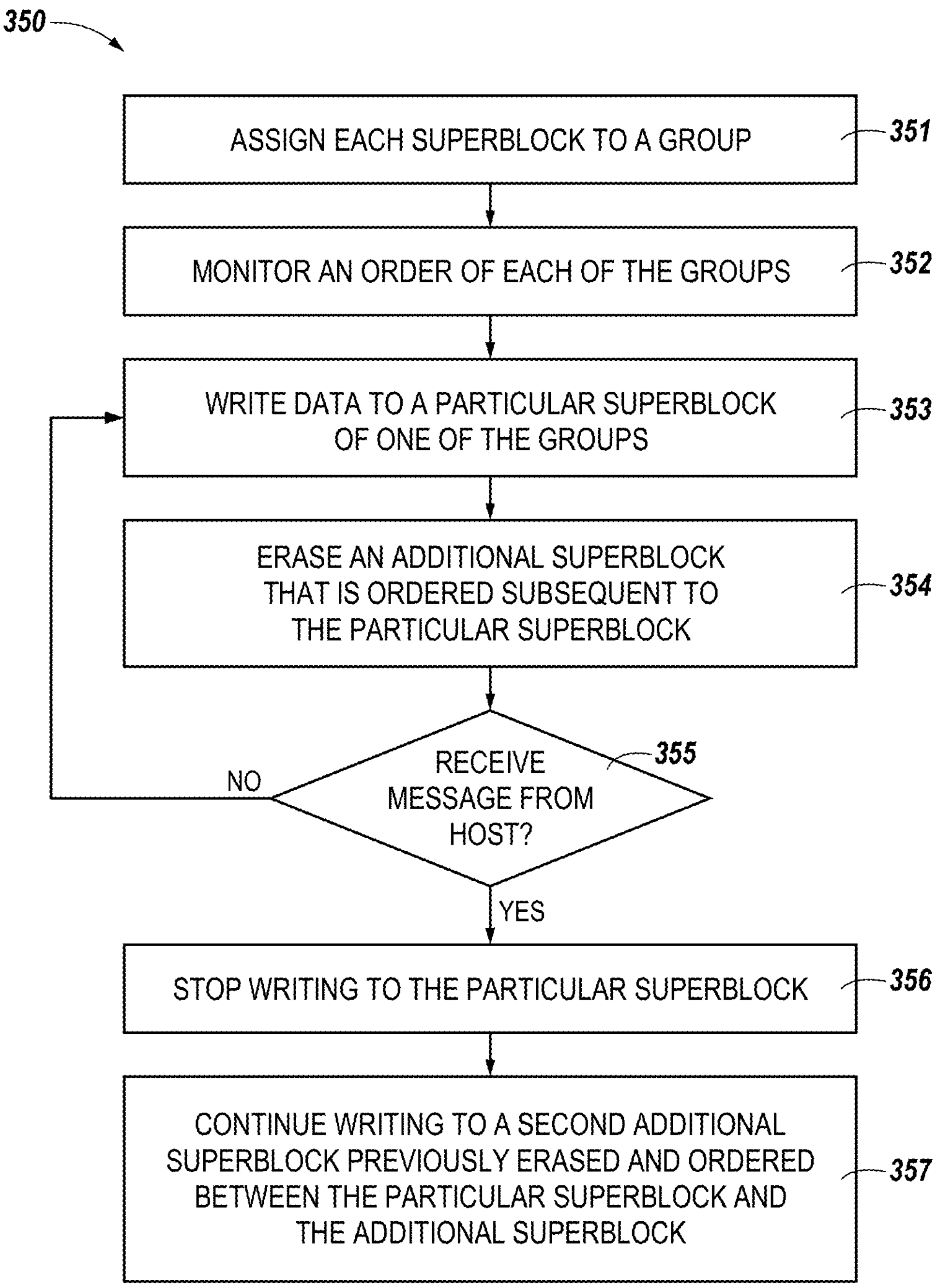
FIG. 3 illustrates a flow diagram corresponding to a method for using media management groups in accordance with some embodiments of the present disclosure.

FIG. 3 illustrates a flow diagram corresponding to a method 350 for using media management groups in accordance with some embodiments of the present disclosure. The method 350 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 350 is performed by the group component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 351, each superblock of a plurality of superblocks can be assigned to one of a plurality of groups. The plurality of groups can be used to perform a number of media management operations. The number of media management operations can include a number of wear leveling operations. The plurality of groups can include a plurality of wear leveling groups used to perform a number of wear leveling operations. The assigning can be performed by a processing device coupled to a memory device (e.g., memory device 130 and/or 140 in FIG. 1). The memory device can be analogous to the memory device 130 and/or 140 of FIG. 1. In some embodiments, the wear leveling groups can be determined to include a particular quantity of superblocks, as is described in association with FIGS. 2A-2C. The quantity of superblocks in a wear leveling group can include two, four, six eight, etc. superblocks, which are given as possible examples of quantities and other examples are not limited to these quantities.

At operation 352, an order of each of the wear leveling groups can be monitored. For example, a first wear leveling group (such as first wear leveling group 227-1) can be ordered first, a second wear leveling group (such as second wear leveling group 227-2) can be subsequent to the first wear leveling group, and so forth. At operation 353, data can be written to a particular superblock of one of the wear leveling groups. As an example, data can be written to blocks of a particular superblock (such as a first superblock) of the first wear leveling group, then to the blocks of a superblock of the second wear leveling group, and so forth.

At operation 354, an additional superblock (such as a third superblock of the first wear leveling group, as a second superblock can be previously erased) can be erased that is ordered subsequent to the particular superblock. At operation 355, a message can be received from a host. In response to not receiving a message from a host ("NO"), data continues to be written to the particular superblock until the particular superblock has been filled with data, then data is written to the second superblock, and so forth. At operation 356, in response to the message being received from a host ("YES"), the writing of data to the particular superblock can be stopped. The message from the host can indicate to write data to a next subsequent superblock. The message from the host can indicate an error and/or a failure in the writing of the data. At operation 357, data can be continued to be written to a second additional superblock previously erased and ordered between the particular superblock and the additional superblock.

In some embodiments, in response to completion of writing data to a particular block of the first wear leveling group, data can be written to a next-ordered block of the first group. In some embodiments, in response to completion of writing data to a particular superblock of the first wear leveling group, writing data to a next-ordered superblock of the first wear leveling group. In some embodiments, in response to completion of writing data to the first wear leveling group, writing data to a beginning portion of the first wear leveling group and overwriting previously written data. In some embodiments, in response to a program failure of the first block of the first superblock, recording a block location and page location where the program failure occurred and writing subsequent data to a third superblock that was erased prior to initiation of the writing of data to the first block. In some embodiments, in response to a second program failure while writing to the third superblock, writing subsequent data to the erased second superblock. In some embodiments, the method 350 can further include, in response to receiving a request from a host to send snapshot data, recording a last page location in a superblock that the processing device is writing to when receiving the request. In some embodiments, the method 350 can further include sending the data written to the first wear leveling group to the host as the snapshot data and writing subsequent data to a next-ordered group.

Figure 4:
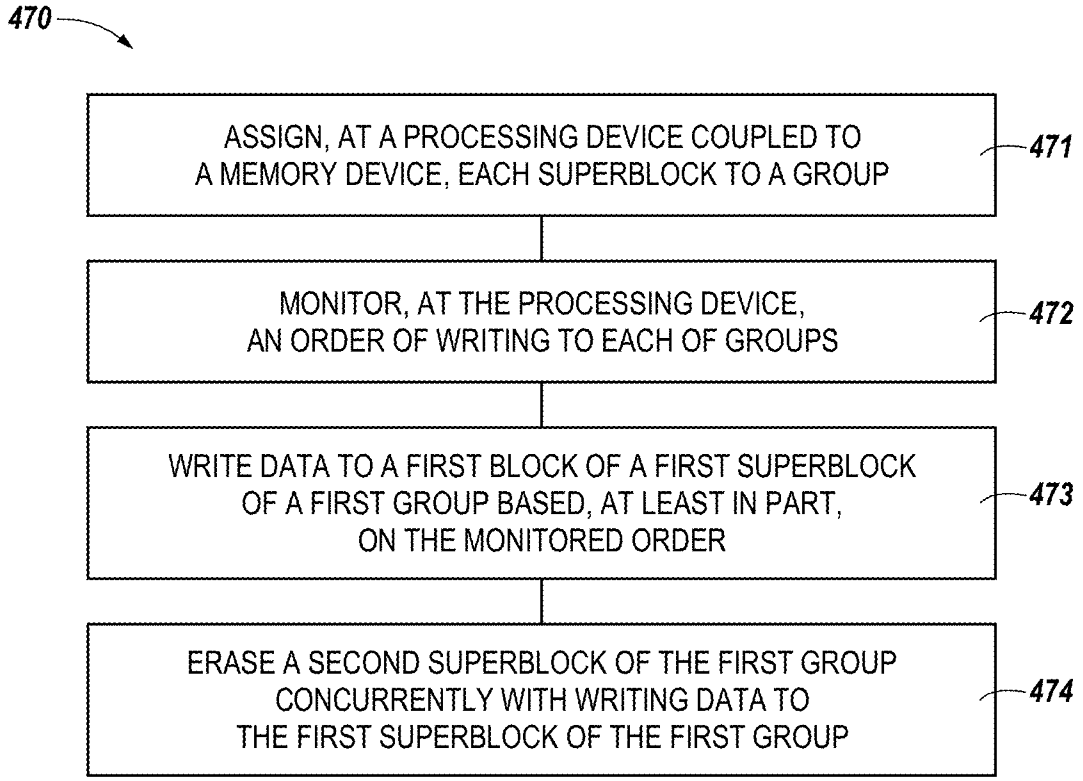
FIG. 4 is a flow diagram corresponding to a method for using media management groups in accordance with some embodiments of the present disclosure.

FIG. 4 is a flow diagram corresponding to a method 470 for using media management groups in accordance with some embodiments of the present disclosure. The method 470 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 470 is performed by the group component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 471, each superblock of a plurality of superblocks can be assigned to one group of a plurality of groups. The plurality of groups can be a plurality of wear leveling groups The plurality of wear leveling groups can be used to perform a number of memory management operations, such as a wear leveling operation. The groups can be determined at a processing device coupled to a memory device. Each of the wear leveling groups can include superblocks of the memory device. The determination can be performed by a processing device coupled to a memory device (e.g., memory device 130 and/or 140 in FIG. 1). The memory device can be analogous to the memory device 130 and/or 140 of FIG. 1. In some embodiments, the wear leveling groups can be determined to include a particular quantity of superblocks, as is described in association with FIGS. 2A-2C. The quantity of superblocks in a wear leveling group can include two, four, six eight, etc. superblocks, which are given as possible examples of quantities and other examples are not limited to these quantities.

At operation 472, an order that each of the wear leveling groups are written to can be monitored at the processing device. For example, a first wear leveling group (such as first wear leveling group 227-1) can be ordered first, a second wear leveling group (such as second wear leveling group 227-2) can be subsequent to the first wear leveling group, and so forth.

At operation 473, data can be written to a first block of a first superblock of a first group of the wear leveling groups. In response to completion of writing data to the first block, a second block of the first superblock can be written to. In response to completion of writing data to the second block, a third block of the first superblock can be written to, and so forth, until the first group is storing data in each of its superblocks.

At operation 474, a second superblock of the first group can be erased concurrently with writing data to the first superblock of the first group. At the completion of writing data to the first superblock, a third superblock can be erased while data is being written to the second superblock (which was previously erased). At completion of writing data to the second superblock, a fourth superblock can be erased while data is being written to the third superblock (which was previously erased), and so forth in a repeated pattern.

Figure 5:
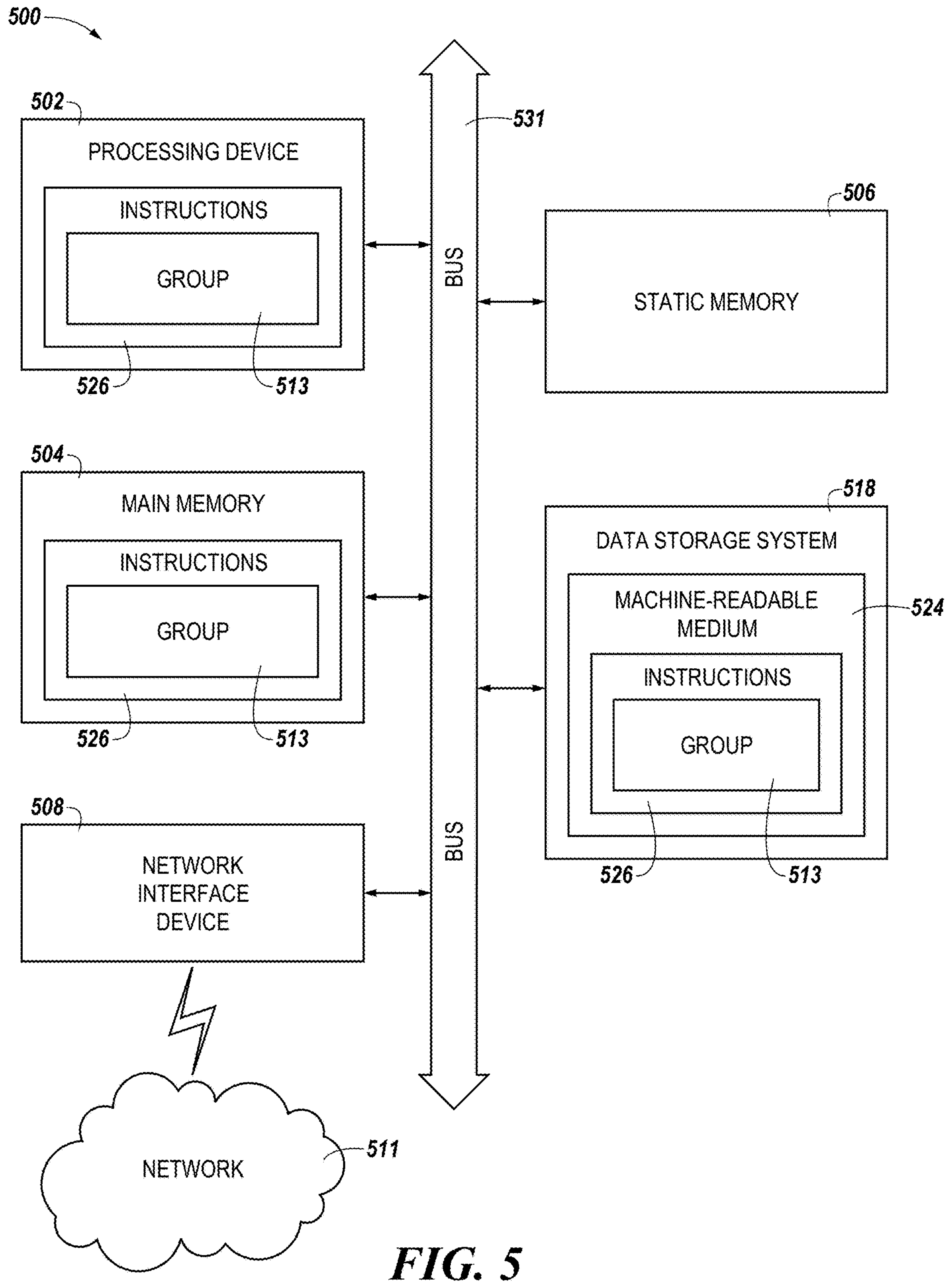
FIG. 5 is a block diagram of an example computer system in which embodiments of the present disclosure may operate.

FIG. 5 is a block diagram of an example computer system 500 in which embodiments of the present disclosure may operate. For example, FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the storage mode component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 531.

The processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 511.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to a group component (e.g., the group component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

In some embodiments, the computing system 500 can include a memory sub-system, which can include a controller (such as controller 115 in FIG. 1) and non-volatile memory device, within a vehicle. The vehicle including the computing system 500 can be a car (e.g., sedan, van, truck, etc.), a connected vehicle (e.g., a vehicle that has a computing capability to communicate with an external server), an autonomous vehicle (e.g., a vehicle with self-automation capabilities such as self-driving), a drone, a plane, a ship, and/or anything used for transporting people and/or goods. The computing system 500 (and also a host (such as host 120 in FIG. 1) coupled to the computing system 500), can be coupled to a number of sensors either directly or via a transceiver. The transceiver can be able to receive time based telemetric sensor data from the sensors wirelessly, such as by radio frequency communication. In at least one embodiment, each of the sensors can communicate with the computing system 500 wirelessly via the transceiver. In at least one embodiment, each of the sensors is connected directly to the computing system 500 (e.g., via wires or optical cables). As used herein, telemetric sensor data means that the data is collected by sensors that are remote from the memory sub-system that stores the data (the receiving equipment). The telemetric sensor data is time based because the data is correlated with time. The time corresponding to each data point can either be stored with the telemetric data or derivable therefrom based on some metric, such as a known start time for the data and a data rate. The time can be useful in the playback of the sequences preceding an accident, for example.

The sensors can include camera sensors collecting data from the front of the vehicle. Some sensors can be microphone sensors collecting data from the from the front, middle, and back of the vehicle. Some sensors can be camera sensors collecting data from the back of the vehicle. As another example, the sensors can be tire pressure sensors. As another example, the sensors can be navigation sensors, such as a global positioning system (GPS) receiver. As another example, the sensors can be a speedometer. As another example, the sensors can represents a number of engine sensors such as a temperature sensor, a pressure sensor, a voltmeter, an ammeter, a tachometer, a fuel gauge, etc. As another example, the sensors can represent a video camera.

The host (such as host 120 which can be coupled to the computing system 500) can execute instructions to provide an overall control system and/or operating system for the vehicle. The host can be a controller designed to assist in automation endeavors of the vehicle. For example, the host can be an advanced driver assistance system controller (ADAS). An ADAS can monitor data to prevent accidents and provide warning of potentially unsafe situations. For example, the ADAS can monitor sensors in the vehicle and take control of vehicle operations to avoid accident or injury (e.g., to avoid accidents in the case of an incapacitated user of a vehicle). The host could need to act and make decisions quickly to avoid accidents. The memory sub-system can store reference data in the non-volatile memory device 616 such that time based telemetric sensor data from the sensors can be compared to the reference data by the host in order to make quick decisions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including solid state drives (SSDs), hard disk drives (HDDs), floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. An apparatus, comprising:

a processor to perform operations comprising:

monitoring an order in which a plurality of groups of superblocks have been written to a memory device, wherein:

each superblock comprises a set of data blocks; and a number of superblocks in each of the plurality of groups of superblocks is determined by a quantity of storage locations available to track data such that there is a first number of superblocks in each of the plurality of groups of superblocks when there is a first quantity of storage locations available to track the data and there is a second number of superblocks in each of the plurality of groups of superblocks that is less than the first number of superblocks when there is a second quantity of storage locations available to track the data that is more than the first quantity of storage locations available to track the data;

writing the data to a particular portion of a first superblock of a first group of the plurality of groups of superblocks; and writing additional data to an additional portion of a second superblock of a second group of the plurality of groups of superblocks.

2. The apparatus of claim 1, wherein each of the plurality of groups of superblocks comprises at least two superblocks.

3. The apparatus of claim 1, wherein each of the superblocks of the plurality of groups of superblocks is assigned thereto for performance of a media management operation.

4. The apparatus of claim 3, wherein the media management operation comprises a wear leveling operation.

5. The apparatus of claim 1, wherein the data is written to the particular portion of the first superblock based, at least in part, on the monitored order.

6. The apparatus of claim 1, wherein the additional data is written to the additional portion of the second superblock based, at least in part, on the monitored order and an occurrence of an event.

7. The apparatus of claim 6, wherein the event comprises one of:

receipt of a request by a host to switch to a different group other than the first group of the plurality of groups of superblocks;

a threshold wear limit of the first group of the plurality of groups of superblocks being reached;

occurrence of a programming error; or a combination thereof.

8. The apparatus of claim 1, wherein the processor is to further perform operations comprising writing the data to each of the blocks of each of the superblocks in the first group.

9. The apparatus of claim 8, wherein, the processor is to further perform operations comprising, in response to writing to an end of the first group, continuing to write the data to a beginning portion of the first group and overwriting previously written data at the beginning portion.

10. The apparatus of claim 1, wherein the processor is to further perform operations comprising erasing a third superblock of the first group, wherein the third superblock is ordered as written to subsequent to the first superblock.

11. The apparatus of claim 10, wherein the third superblock is erased concurrently with the writing of the data to the first block of the first superblock.

12. A method, comprising:

monitoring, at a processing device, an order in which a plurality of groups of superblocks have been written, wherein each of the superblocks of the plurality of groups of superblocks is assigned thereto for performance of a media management operation, and wherein a number of superblocks in each of the plurality of groups of superblocks is determined by a quantity of storage locations available to track data such that there is a first number of superblocks in each of the plurality of groups of superblocks when there is a first quantity of storage locations available to track the data and there is a second number of superblocks in each of the plurality of groups of superblocks that is less than the first number of superblocks when there is a second quantity of storage locations available to track the data that is more than the first quantity of storage locations available to track the data;

writing the data to a first block of a first superblock of a first group of the plurality of groups of superblocks based, at least in part, on the monitored order; and erasing a second superblock of the first group concurrently with writing data to the first superblock of the first group.

13. The method of claim 12, further comprising determining an oldest group of the plurality of groups of superblocks.

14. The method of claim 13, further comprising writing additional data to a first superblock of a second group of the plurality of groups of superblocks based, at least in part, on the monitored order and the determination of the oldest group.

15. The method of claim 12, further comprising, in response to a program failure of the first block of the first superblock, recording a block location and page location where the program failure occurred.

16. The method of claim 15, further comprising, in response to a program failure of the first block of the first superblock, writing subsequent data to a third superblock that was erased prior to initiation of the writing of data to the first block.

17. The method of claim 15, further comprising sending the data written to the first group to a host as snapshot data.

18. The method of claim 17, further comprising writing subsequent data to a next-ordered group.

19. A system, comprising:

a memory device comprising a plurality of superblocks;

a processing device coupled to the memory device, the processing device to perform operations comprising:

monitoring, at the processing device, an order in which:

a plurality of groups of superblocks have been written and monitoring a wear leveling characteristic associated with each of the plurality of groups of superblocks; and each of the superblocks associated with a respective group of the plurality of groups of superblocks are written;

wherein a number of superblocks in each of the plurality of groups of superblocks is determined by a quantity of storage locations available to track data such that there is a first number of superblocks in each of the plurality of groups of superblocks when there is a first quantity of storage locations available to track the data and there is a second number of superblocks in each of the plurality of groups of superblocks that is less than the first number of superblocks when there is a second quantity of storage locations available to track the data that is more than the first quantity of storage locations available to track the data;

writing the data to a particular superblock of a first group of the plurality of groups of superblocks; and erasing an additional superblock that is ordered subsequent to the particular superblock in the first group.

20. The system of claim 19, wherein in response to a program failure occurring:

stopping the write to the particular superblock;

recording a block location and a page location where the program failure occurred;

continuing to write to the additional superblock previously erased; and in response to returning to the particular superblock for subsequent writing, begin writing at the recorded block location and the recorded page location.

* * * * *